May 22, 1962 D. M. HAWKINS ET AL 3,036,254
GENERATOR FED MOTOR CONTROL SYSTEM
Filed April 24, 1959
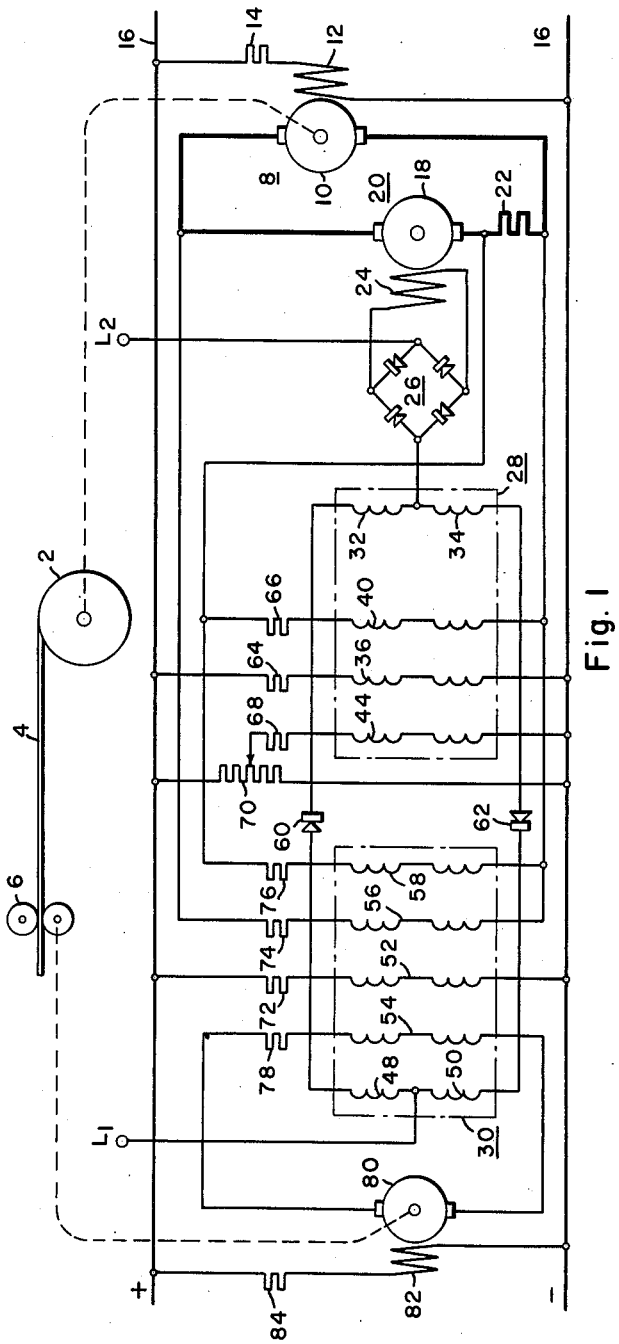
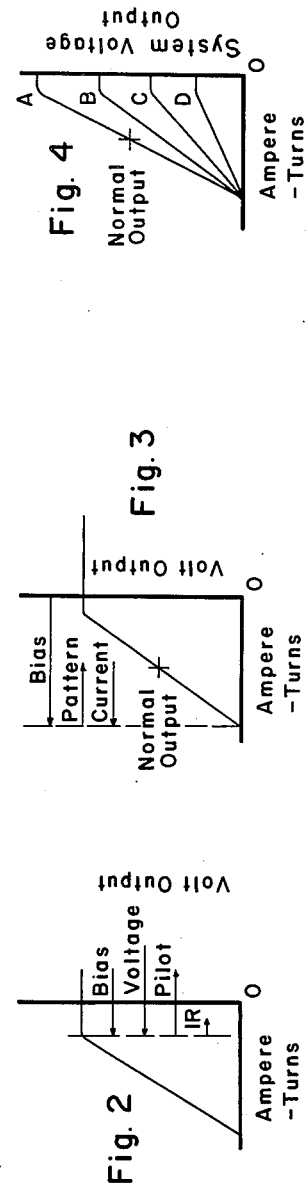
WITNESSES
John E. Healy Jr.
Ernest P. Klipfel
INVENTORS
David M. Hawkins &
Donald E. Abell
BY
Paul E. Friedemann
ATTORNEY

United States Patent Office 3,036,254
Patented May 22, 1962

3,036,254
GENERATOR FED MOTOR CONTROL SYSTEM
David M. Hawkins, Tonawanda, and Donald E. Abell, Lancaster, N.Y., assignors to Westinghouse Electric Corporation, East Pittsburgh, Pa., a corporation of Pennsylvania
Filed Apr. 24, 1959, Ser. No. 808,817
8 Claims. (Cl. 318—143)

This invention relates generally to motor control systems and more particularly to a regulator system for a winding reel motor.

It is an object of the present invention to provide an improved magnetic amplifier control system to regulate the tension and speed of a winding reel motor drive.

It is a further object of this invention to provide a regulating scheme for a winding reel motor drive having improved transient response characteristics.

It is another object of the present invention to provide a control system for winding reel motor drive using series connected magnetic amplifiers for an applicable feedback regulation system.

Another object of this invention is to provide, in a control system for a winding reel motor drive, for normally supplying to a regulator for the reel motor a voltage proportional to the motor armature current, and for using a second regulator for limiting the available output capabilities of the first regulator only when the speed of the drive motor exceeds the speed of an associated work device supplying material to the reel by a predetermined value.

Another object of this invention is to provide in a control system for a winding reel motor drive, a current regulator and a speed limit regulator with the latter regulator operating directly upon the winding reel motor drive when the speed of the reel motor exceeds the speed of an associated work device supplying material to the reel by a predetermined value.

Another object of this invention is to provide in a control system for a winding reel motor drive a current regulator and a speed limit regulator permitting speed limit regulation from standstill to a running speed of the reel motor and thereafter allowing control solely by the current regulator until the speed of the motor exceeds a predetermined relation to the speed of an associated work device.

It is a further object of this invention to provide in a control system for a winding reel motor drive a simple and smooth speed limit regulation while reducing the number of control windings normally required for a current regulation.

It is another object of this invention to provide a regulating scheme for a control system for a winding reel motor drive having current regulation and speed limit regulation while reducing the number of reactors normally used.

Although this invention has many applications, the invention has been chosen to be illustrated in a winding reel motor drive. In such an application, it is desirable to maintain constant tension as the material on the reel increases the effective radius of the reel, while at the same time limiting the speed of the reel should the strip tie between the mill and the reel be broken or abnormal, as during a threading or start-up operation.

To obtain such regulation the armature of the reel motor is connected in a closed circuit with the armature of the generator having a field winding which is energized under the control of two magnetic amplifiers. The load windings of the amplifiers are connected in a common series circuit including the generator field winding and the common series circuit is connected to a suitable power source. The reactor of either magnetic amplifier is capable of absorbing the entire line voltage of the power source, that is, either reactor is capable of cutting the system off regardless of what the other reactor is trying to accomplish. In such a manner it is possible to have a minor loop of a regulator system on one reactor being responsive for example, to the armature current for maintaining a predetermined value of tension in a strip or web of material being supplied to the reel from an associated work device; and a major loop of a regulator system on the other reactor. The major loop reactor may normally be saturated so that complete line voltage appears across the minor loop reactor, but which may become unsaturated to an extent proportional to the difference in the speed of the reel motor against the speed of an associated work device supplying material to the reel upon the difference reaching a predetermined value and thereby absorbing some line voltage and reducing the line voltage available to the minor loop reactor. Such an arrangement permits the effect of having twice as many control windings as would be available on one reactor and reduces the number of time delays thereby increasing transient response.

A more complete understanding of the nature and scope of our invention will be readily apparent from the following detailed description taken in conjunction with the drawing, in which:

FIGURE 1 is a schematic diagram of a winding reel motor drive embodying the invention in one of its forms;

FIG. 2 is a characteristic output curve of a device used in practicing our invention;

FIG. 3 is a characteristic output curve of another device used in practicing our invention; and FIG. 4 is a characteristic output curve attainable in a system when practicing our invention.

Referring to FIG. 1, a reel 2 is disposed to wind a strip or web of material 4 proceeding from rolls 6 of an adjacent work piece, such as a mill stand or the like. The reel 2 is mechanically connected to be driven by a reel motor 8 having an armature 10 and a field winding 12 which is energized through a current limiting resistor 14 by the leads 16 of a constant potential source. The leads 16 have been designated with a particular polarity. However, it is to be understood that either lead may be positive or negative. The armature 10 is connected in a common closed series circuit relation with a resistor 22 and an armature 18 of a generator 20. The generator 20 has a field winding 24 connected to a source of alternating current L1, L2 through a full wave rectifier bridge circuit 26 and the load windings of a current regulating magnetic amplifier 28 and a speed limit regulator magnetic amplifier 30.

The first magnetic amplifier 28 herein referred to as the current regulating magnetic amplifier may be considered to be in the minor loop of the regulator system while the second magnetic amplifier 30, hereinafter referred to as the speed limit magnetic amplifier, may be considered to be part of the major loop of the regulator system.

The first magnetic amplifier device 28 contains a magnetic core which, in actual practice could comprise a pair of magnetic core segments, and which has inductively disposed thereon a first load winding 32 and a second load winding 34, a bias winding 36 and a first control winding 40 hereinafter referred to as the current winding and a second control winding 44 hereinafter referred to as the pattern control winding. In this regard, it is to be understood that additional control windings may be provided for the magnetic amplifier devices 28 and 30, if desired, in accordance with the teachings of the present invention. However, for the purpose of explaining the subject invention, it is believed that the control windings shown will be adequate.

The second magnetic amplifier device 30 contains a magnetic core which has inductively disposed thereon a first load winding 48 and a second load winding 50, a bias winding 52, and three control windings, namely, a pilot control winding 54, a voltage control winding 56, and an IR drop compensation control winding 58. A first rectifier device 60 is connected in a first series circuit including the first load winding 32 of the magnetic amplifier device 28 and the first load winding 48 of the magnetic amplifier device 30. A second rectifier device 62 is inversely connected in a similar second series circuit including the second load winding 34 of the first magnetic amplifier device 28 and the second load winding 50 of the second magnetic amplifier device 30. The rectifier devices 60 and 62 are inversely connected in the first and second series circuit to provide for unidirectional conduction in opposite senses. The source of alternating voltage L1, L2 is connected across a common series circuit comprising the previously mentioned first and second series circuits and the generator field 24. A rectifier bridge 26 is included in the common series circuit since the field 24 is a direct current load device. In this regard, it should be understood that an alternating current type of load device could be used and included in the circuit with the alternating current source L1, L2 for applications other than the present illustrative embodiment and that the rectifier bridge assembly 26 would then be omitted.

Referring to the first magnetic amplifier device 28, hereinafter designated as the current regulating magnetic amplifier, the bias winding 36 is connected through a resistor 64 to the source of constant potential 16. From FIG. 3 it will be seen that the bias control winding is selected to have a potential sufficient to bias the current regulating magnetic amplifier 28 to cutoff. The current control winding 40 is connected through a resistor 66 across the resistor 22 in the closed series loop between the motor and generator armatures. The current control winding is connected cumulatively with respect to the bias winding 36 and is energized in accordance with the armature current between the motor and generator. The pattern control winding 44 is connected differentially to the bias and current windings and is adapted to be energized through a resistor 68 across a tension adjusting rheostat 70 connected across the constant voltage potential leads 16.

The second magnetic amplifier device 30 hereinafter referred to as the speed limit magnetic amplifier, is biased to saturation by the bias control winding 52 connected across the constant potential source leads 16 through a resistor 72. The voltage control winding 56 is cumulatively connected with respect to the bias winding 52 and is adapted to be energized by the voltage appearing across the motor armature 10 through a resistor 74. Differentially connected with respect to the bias and voltage windings are an IR drop compensation winding 58, connected to be energized in accordance with the motor armature current flow through the resistor 22, and a pilot control winding 54, energized from a pilot generator 80 driven by the rolls 6 to provide an indication of the speed of the associated work device and the strip 4. A dropping resistor 76 and resistor 78 are connected in series with the IR drop compensation winding 58 and pilot control winding 54 respectively, to reduce the potential across the windings. The pilot generator 80 has its own field winding 82 which is energized through a resistor 84 by the constant potential source leads 16.

In normal operation, the speed limit regulating magnetic amplifier 30 is biased to maximum output so that substantially all of the voltage from the alternating current source L1, L2 is available to the current regulating magnetic amplifier 28. The speed of the rolls 6 will very closely match the speed of the reel motor 8, so the net excitation of the pilot generator, voltage, and IR drop compensation windings 54, 56 and 58 respectively, is substantially of zero effect upon the speed limit regulating magnetic amplifier 30. The excitation of the current control winding 40 of the magnetic amplifier 28 will substantially balance the excitation of the pattern control winding 44. The regulator 28 will operate to maintain a predetermined value of armature current selected by the setting of the potentiometer 70 and hence maintain constant tension on the strip 4.

As the output of the current regulating magnetic amplifier 28 is increased, the total output of the magnetic regulating system applied across the generator shunt field 24 follows curve A of FIG. 4. With the high gain system used on the current regulator magnetic amplifier 28, the excitation in either the pattern or current windings, applied separately, would saturate the reactor, and thus the system output, far beyond the normal and maximum output shown on curve A.

Should the strip 4 break such that the reel motor 8 can not apply the desired strip tension, the motor armature current will be substantially reduced and the excitation of the current winding 40 is very greatly weakened. However, the excitation on the pattern winding 44 is maintained thereby forcing the current regulating magnetic amplifier 28 to its maximum output. Hence, the system output across the generator field winding 24 is also forced to maximum. If unrestricted, the generator voltage would rise to excessively overspeed the motor. However, the IR drop compensating winding 58 is also greatly diminished in its excitation by the weakened current in the motor armature 10. The increased generator voltage, being forced ever upward by the current regulating magnetic amplifier 28, is connected to excite the voltage control winding 56 of the speed limit regulating magnetic amplifier 30. Because of the greatly weakened IR drop compensating winding excitation and the higher excitation of the voltage control winding 56 the speed limit regulating magnetic amplifier 30 is forced to reduce the output of its load windings 48 and 50 and tends toward cutoff. As the speed limit regulating magnetic amplifier 30 is unsaturated, the system output curve is lowered as shown by the curves B, C, and D in FIG. 4. As the speed limit regulating magnetic amplifier 30 is unsaturated, the available alternating current voltage to the load windings 32 and 34 of the current regulating magnetic amplifier 28 is accordingly reduced. The armature current continues to drop off and the current regulating magnetic amplifier 28 attempts to saturate. The current regulating magnetic amplifier 28 reduces its output until no further forcing is required. The amount of reel motor overspeed decreases as the final slope of the curve decreases from curve A to curve D. The gain and the voltage winding excitation will determine the final slope necessary to provide the steady state output required to maintain the speed of the reel motor to match the roll speed since the pilot winding excitation remains fixed.

The present invention also permits speed limit regulation from standstill to a running speed as may be desirable during threading or start-up. The mill pilot generator 80, which furnishes the reference quantity, provides an increased voltage output to the pilot control windings 54. Excitation to the pattern winding control 44 is applied to increase the system output across the generator field winding 24 to maximum. The voltage of the generator 20 rises to accelerate the reel motor 8 until the excitation on the voltage winding 56 overcomes the excitation of the pilot winding 54. At this point, the speed limit feature described previously will occur.

The present invention provides for simple and smooth speed limit regulation. At the same time the number of control windings usually required on the current regulating magnetic amplifier have been reduced.

While conventional regulating systems for a winding reel motor drive operate the speed limiting magnetic amplifier through the current regulating magnetic amplifier, the present invention allows the generator field winding to be controlled by the speed limit regulating magnetic amplifier only should the reel motor speed become excessive. During normal operation the excitation of the generator field winding is controlled only by the current limiting regulating magnetic amplifier. An important advantage of the present invention is that the output of the speed limiting regulating magnetic amplifier is fed directly to the generator field winding eliminating the additional time delay inherent in feeding its output first through the current regulating magnetic amplifier.

The present invention has application where acceleration to a given voltage or speed is required by current limit means. The speed limit feature of the present invention has excellent performance characteristics unattainable by other speed limit schemes without greatly increasing the number of reactors normally used on reel drive regulators.

While this invention has been described with a certain degree of particularity for the purposes of illustration, it is to be understood that all alterations, equivalents, and modifications within the spirit and scope of the invention are herein meant to be included. For example, although the regulating system has been shown with separate excitation windings with the different signals being applied individually, it is realized that the signals may be mixed, if desired, and applied to a single winding, without departing from the scope of the invention. Should it be desirable that the regulating system be applied in other applications wherein the load device is of the alternating current type, the rectifier bridge 26 would be omitted.

We claim as our invention:

1. A regulator circuit for a device to be controlled comprising first and second magnetic amplifiers including first and second output windings and first and second control windings respectively, said output windings being connected in a common series circuit including the device to be controlled, the common series circuit being adapted to be connected to a power source, said first magnetic amplifier biased to normally have minimum output, said second magnetic amplifier biased to normally have maximum output, first condition responsive energization means connected to the first control windings for varying the output of the first magnetic amplifier, and second condition responsive energization means connected to the second control windings responsive to the output of said first magnetic amplifier for reducing the output of said second magnetic amplifier.

2. In a control system for a motor having an armature and a field winding, a generator having an armature connected in series with the motor armature and having a field winding, regulating means comprising a first magnetic amplifier device including a first magnetic core and a first load winding positioned on said first magnetic core, a second magnetic amplifier device including a second magnetic core and a second load winding positioned on said second magnetic core, said first load winding and said second load winding being connected in a common series circuit including the generator field winding, the common series circuit being adapted to be connected to a power source, said first and second magnetic amplifier devices having first and second control excitation means respectively, first circuit means for applying to the first control excitation means current responsive and reference voltages, second circuit means responsive to the speed of the motor and an associated work device for applying a control voltage to the second excitation means reducing the output of the second device only when the speed of the motor exceeds a predetermined relation with that of the work device.

3. In a motor control system, a generator for supplying electrical energy to the motor, said generator having an armature connected in circuit with the motor and having a field winding, means for supplying excitation to said field winding including a first and second amplifier having first and second input means and first and second output means respectively, said first and second output means connected in a common series circuit with said field winding, the common series circuit being adapted to be connected to a power source, first circuit means for applying to said first input means opposing signals in accordance with the armature current and an adjustable reference quantity to regulate for a predetermined value of armature current, second circuit means for applying a signal to said second input means reducing the output of the second output means in accordance with the differential between the speed of the motor and the speed of an associated work piece.

4. In a control system for a motor having an armature and a field winding; a generator having an armature connected in closed circuit relation with the motor armature and having a field winding; regulating means comprising a current regulating magnetic amplifier having a first pair of load windings, a speed limit regulating magnetic amplifier having a second pair of load windings, a rectifier device connecting one of each pair of load windings in inverse parallel relation with the other load windings similarly connected, rectifier means connecting the generator field winding to a source of alternating current through said load windings, a plurality of control windings for said current regulating magnetic amplifier including a pattern winding connected to an adjustable reference source and a current winding energized differentially in accordance with the armature current of the motor to normally maintain a predetermined value of motor armature current, and a plurality of control windings for said speed limit regulating magnetic amplifier including opposed windings energized in accordance with the armature current and voltage of the generator and another control winding energized cumulatively with respect to the current control winding in accordance with the speed of an associated work device.

5. In a control system for a motor having an armature and a field winding, a generator having an armature connected in series with the motor armature and having a field winding, regulating means comprising a first magnetic amplifier device having a first magnetic core and including a first load winding positioned on said first magnetic core, a second magnetic amplifier device having a second magnetic core and including a second load winding positioned on said second magnetic core, said first load winding and said second load winding being connected in a common series circuit including the generator field winding, the common series circuit being adapted to be connected to a power source, said first and second magnetic amplifier device having first and second control excitation means respectively, first circuit means for applying to the first control excitation means current responsive and reference voltages, second circuit means responsive only to the saturation of said first magnetic core for applying a resultant control voltage to the second excitation means.

6. In a motor control system, a generator for supplying electrical energy to the motor, said generator having an armature connected in circuit with the motor and having a field winding, regulating means comprising current regulator means and speed limit regulator means having their outputs connected in a common series circuit including the generator field winding, the common series circuit being adapted to be connected to a power source, said current regulator means having an output responsive to the difference in armature current and a reference quantity, said speed limit regulator means only reducing the maximum output capabilities of said current regulator means in response to a predetermined speed differential between the motor and an associated work piece thereby limiting the excitation of said field winding.

7. In a motor control system, a generator for supplying electrical energy to the motor, said generator having an armature connected in circuit with the motor and having a field winding, regulating means comprising a first magnetic amplifier device including a first magnetic core and a first load winding positioned on said first magnetic core, a second magnetic amplifier device including a second magnetic core and a second load winding positioned on said second magnetic core, said first load winding and said second load winding being connected in a common series circuit including the generator field winding, the common series circuit being adapted to be connected to a power source, said first and second magnetic amplifier devices having first and second control excitation means respectively, first circuit means for applying to the first control excitation means a cut-off bias, current responsive, and reference voltages, second circuit means having a saturating bias potential and being responsive to the speed of the motor and an associated work device for applying a control voltage to the second excitation means reducing the output of the second device only when the speed of the motor exceeds a predetermined relation with that of the work device.

8. In a control system for a motor having an armature, a generator having an armature connected in series with the motor armature and having a field winding, means for supplying excitation to said field winding including regulating means comprising a first magnetic amplifier device including a first magnetic core and a first load winding positioned on said first magnetic core, a second magnetic amplifier device including a second magnetic core and a second load winding positioned on said second magnetic core, said first load winding and said second load winding being connected in a common series circuit including the generator field winding, the common series circuit being adapted to be connected to a power source, said first and second magnetic amplifier device having first and second control excitation means respectively, first circuit means for applying to the first control excitation means a cutoff bias, motor armature current responsive, and reference voltages, second circuit means for applying to the second control excitation means a saturating bias potential, said second circuit means also responsive to the speed of the motor and an associated work device for applying a control voltage to the second excitation means to unsaturate said second magnetic amplifier proportionally to the extent that the speed of the motor exceeds a predetermined relation with that of the work device thereby reducing the available voltage from the power source to the first magnetic amplifier device.

References Cited in the file of this patent

UNITED STATES PATENTS

| 2,845,586 | Stringer | July 29, 1958 |
| 2,853,668 | Moore | Sept. 23, 1958 |

FOREIGN PATENTS

| 555,795 | Canada | Apr. 8, 1958 |